(12) United States Patent
Merritt

(10) Patent No.: US 7,574,955 B2
(45) Date of Patent: Aug. 18, 2009

(54) TWO POSITION BALE FORMING ROLL

(75) Inventor: John H. Merritt, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/030,714

(22) Filed: Feb. 13, 2008

(65) Prior Publication Data
US 2009/0000262 A1 Jan. 1, 2009

Related U.S. Application Data

(60) Provisional application No. 60/947,187, filed on Jun. 29, 2007.

(51) Int. Cl.
*B30B 5/06* (2006.01)
*A01D 39/00* (2006.01)
(52) U.S. Cl. .............. 100/87; 100/88; 56/341; 248/205.1
(58) Field of Classification Search .......... 100/87, 100/88, 89, 177; 56/341, 344; 248/205.1, 248/259, 270, 271
See application file for complete search history.

(56) References Cited

U.S. PATENT DOCUMENTS

| 2,752,798 A | 7/1956 | Swavely |
| 3,712,454 A | 1/1973 | McKee |
| 3,914,926 A * | 10/1975 | Braunberger et al. ......... 56/341 |
| 4,092,914 A * | 6/1978 | Burrough et al. ............. 100/88 |
| 4,150,527 A | 4/1979 | Meiers |
| 4,790,125 A | 12/1988 | Merritt |
| 4,870,812 A | 10/1989 | Jennings et al. |
| 5,138,942 A | 8/1992 | Henderson et al. |
| 5,333,516 A * | 8/1994 | Edwards et al. ......... 74/665 GC |
| 6,101,933 A | 8/2000 | Esken |
| 2003/0115841 A1 * | 6/2003 | Davis et al. .................. 53/587 |

FOREIGN PATENT DOCUMENTS

| EP | 0264492 A1 | 4/1988 |
| JP | 56234657 A | 10/1981 |
| JP | 05278820 A | 10/1993 |

* cited by examiner

*Primary Examiner*—Jimmy T Nguyen
(74) *Attorney, Agent, or Firm*—Patrick M. Sheldrake; John William Stader; Michael G. Harms

(57) ABSTRACT

A roll mounting apparatus for the lower bale forming roll of a round baler enabling the roll to be selectively installed in one of two positions using common mounting components. The normal roll mounting aperture in the side wall allowing the roll shaft ends to extend therethrough is elongated to permit limited radial movement of the shaft. A reversible adapter connected to the main frame (one on each main frame side wall) at each end of the shaft covers a portion of the elongated aperture and provides a mounting connector (threaded hole) to replace a fastener receptacle eliminated by elongation of the aperture. By repositioning the adapter, the shaft may be displaced radially to one of two positions, thereby allowing the roll to be installed in an optimum location for the crop material or to enable manufacturing flexibility. The roll can easily be relocated to the other position, as necessary, using bolted connections securing the adapter to the side walls and the roll shaft bearing to the frame and adapter.

19 Claims, 4 Drawing Sheets

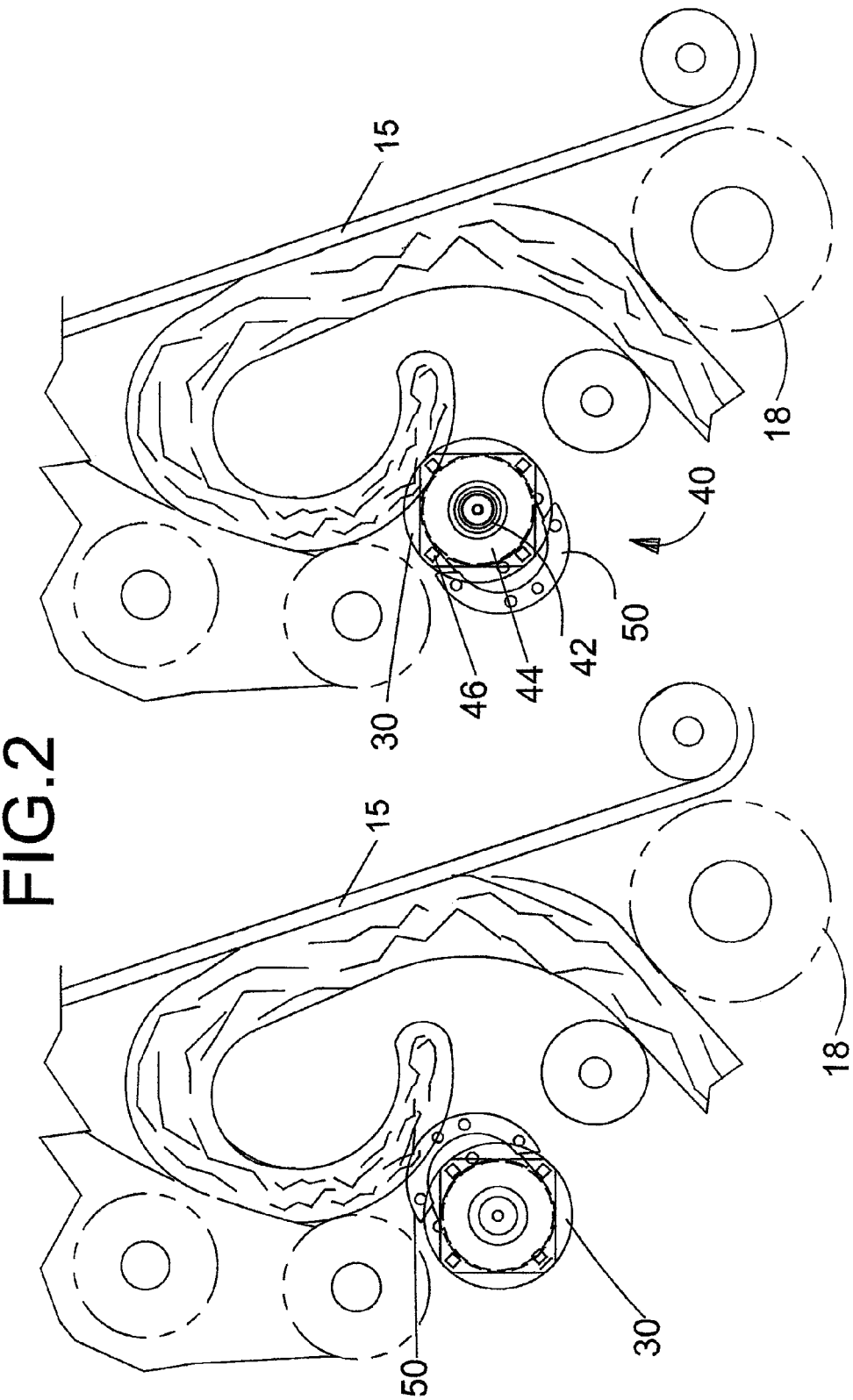

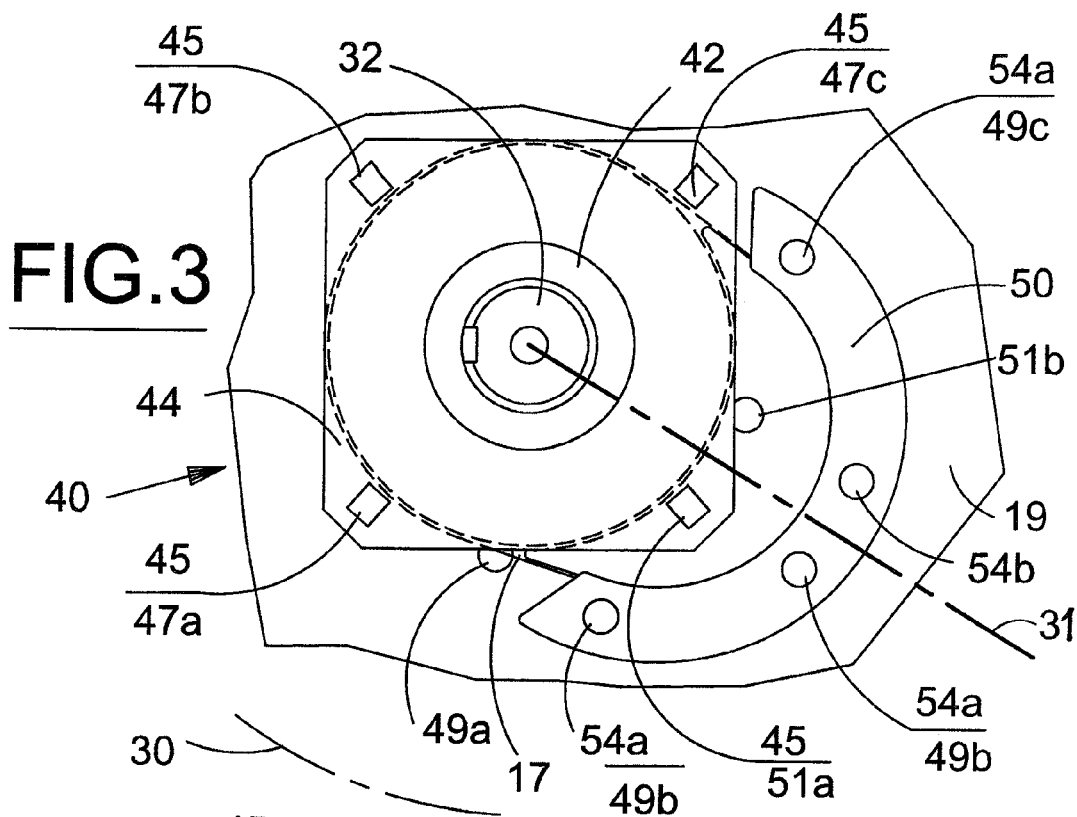
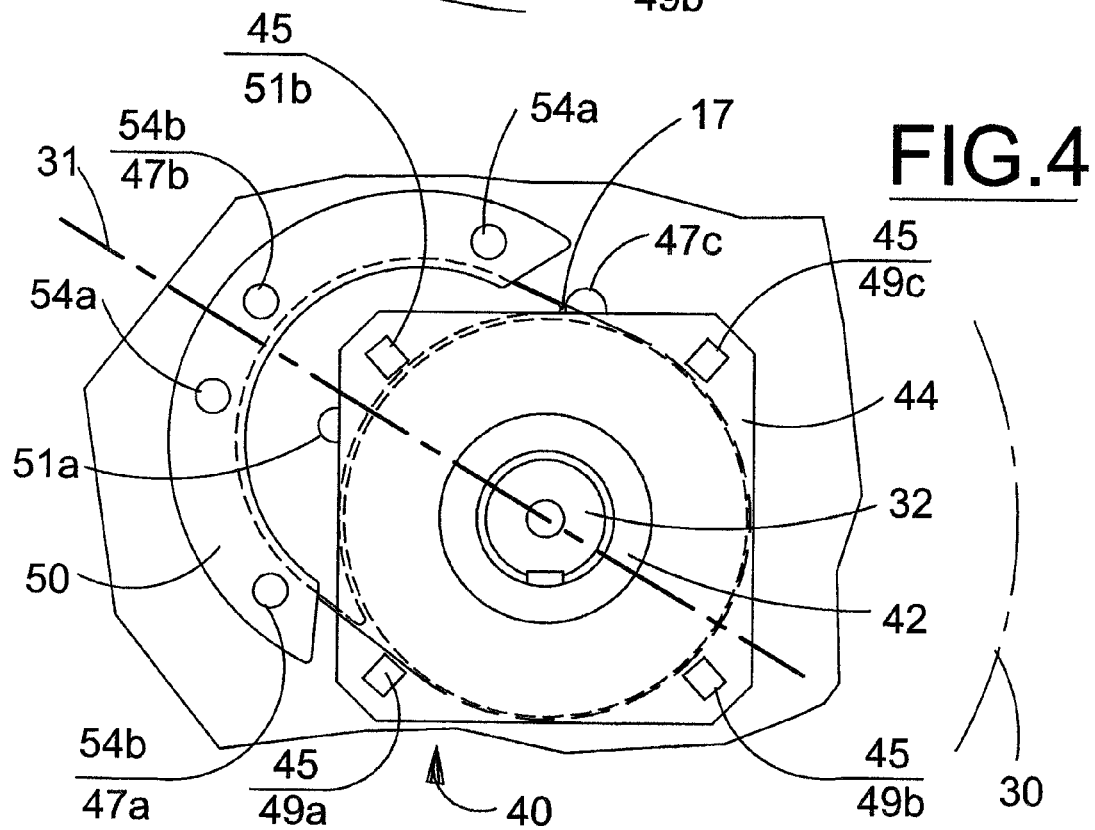

TWO POSITION BALE FORMING ROLL

CROSS-REFERENCE TO RELATED APPLICATIONS

This application claims the benefit of priority of U.S. Provisional Application 60/947,187, filed Jun. 29, 2007.

BACKGROUND OF THE INVENTION

The present invention relates generally to round balers, and more particularly to an adjustment apparatus for a round baler that enables the lower bale forming roll position to be altered for optimal positioning for the crop being baled.

In the crop packaging industry, generally a smaller part of the cattle/dairy industry, round balers have become quite prevalent for their capability of producing a conveniently sized cylindrical bale. Prior art round balers generally have a bale-forming chamber defined by an apron comprising an array of side-by-side belts, transverse slats trained on chains, a plurality of rolls or a combination of these various elements, e.g., rolls and belts. Crop material is picked up from the ground as the baler travels across the field, and is fed into a fixed or expandable chamber where it is rolled up to form a compact cylindrical hay package. A wide array of crop material, such as hay, straw, or silage may be fed into the baler creating the need to adjust the way in which crop material is fed into and handled by the bale forming apparatus.

Testing on roll belt round balers has demonstrated that the optimal lower bale forming roll position differs for different machine configurations and for different crops. Providing the capability for alternate lower bale forming roll position requires producing multiple variations of the relatively robust main frame which provides support for the bale forming rolls or providing multiple roll mounts in a single main frame. It is not practical to build multiple versions of baler main frames and base units to accommodate different roll locations. Incorporating multiple roll mounting locations may not be achievable if the variation in mounting positions is small. Additionally, bale forming rolls are subjected to significant loads by the incoming crop and bale so that any mechanism that provides the capability of altering the roll position must be suitably robust to withstand the structural loads.

SUMMARY OF THE INVENTION

Accordingly, it is an object of the present invention to provide an adjustable mount for a bale-forming roll in a round baler that allows the lower bale forming roll to be easily positioned in one of two positions while using a standard main frame and roll mounting components (e.g., bearings, shafts, bearing mounting flanges, fastener holes, and the like).

It is another object of the present invention to provide an adapter for the bale-forming roll mounts in a round baler which is reversible such that the same adapter design is useful for the lower roll mounts on each side of a round baler.

It is a further object of the present invention to provide an adapter for the lower bale forming roll mounts that allows the lower bale forming roll to be selectively positioned in one of two positions which requires only minor alteration of the standard round baler. The present invention requires only that chassis mounting hole in the main frame be elongated to allow the roll shaft extending through the main frame side panels a path of limited movement between at least two optimal roll locations.

It is a further object of the present invention to provide an adapter for the lower bale forming roll mounts that installs using bolted connections.

It is a still further object of the present invention to provide an adapter for the lower bale forming roll mounts of a round baler that is durable in construction, inexpensive of manufacture, carefree of maintenance, easily assembled, and simple and effective to use.

These and other objectives are achieved by providing a roll mounting apparatus for the lower bale forming roll of a round baler enabling the roll to be selectively installed in one of two positions using common mounting components. The normal roll mounting aperture in the side wall allowing the roll shaft ends to extend therethrough is elongated to permit limited radial movement of the shaft. A reversible adapter connected to the main frame (one on each main frame side wall) at each end of the shaft covers a portion of the elongated aperture and provides a mounting connector (threaded hole) to replace a fastener receptacle eliminated by elongation of the aperture. By repositioning the adapter, the shaft may be displaced radially to one of two positions, thereby allowing the roll to be installed in an optimum location for the crop material or to enable manufacturing flexibility. The roll can easily be relocated to the other position, as necessary, using bolted connections securing the adapter to the side walls and the roll shaft bearing to the frame and adapter.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a partial side view showing the relation of the first and second positions for the lower bale forming roll as enabled by the present invention;

FIG. 3 is a partial side elevation view of the main chassis of a round baler showing the present invention and the end mounting bearing for a lower roll in a first position;

FIG. 4 is a partial side elevation view of the main chassis of a round baler showing the present invention and the end mounting bearing for a lower roll in a second position.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

It should be noted that throughout this description the drawings are diagrammatic in nature to best show the elements of the invention. The accompanying figures show an embodiment of the invention as described presenting a view of the left side of a typical round baler on which the present invention is useful. To this end, in many instances only one element in a pair is shown, especially in those cases where identical elements exist, disposed on opposing sides of the baler, e.g., wheels. It is to be understood that the both sides of the main frame would require an adapter and elongated aperture in the side walls to enable both ends of the bale forming roll shaft to be mounted and repositioned in concert. The adapter and elongated (slotted) aperture maintain the roll bearing mounting flange fastener pattern so that no change to the roll configuration or mounting hardware, other than the adapter, is necessary to provide two position roll mounting using the present invention.

Figure 1:
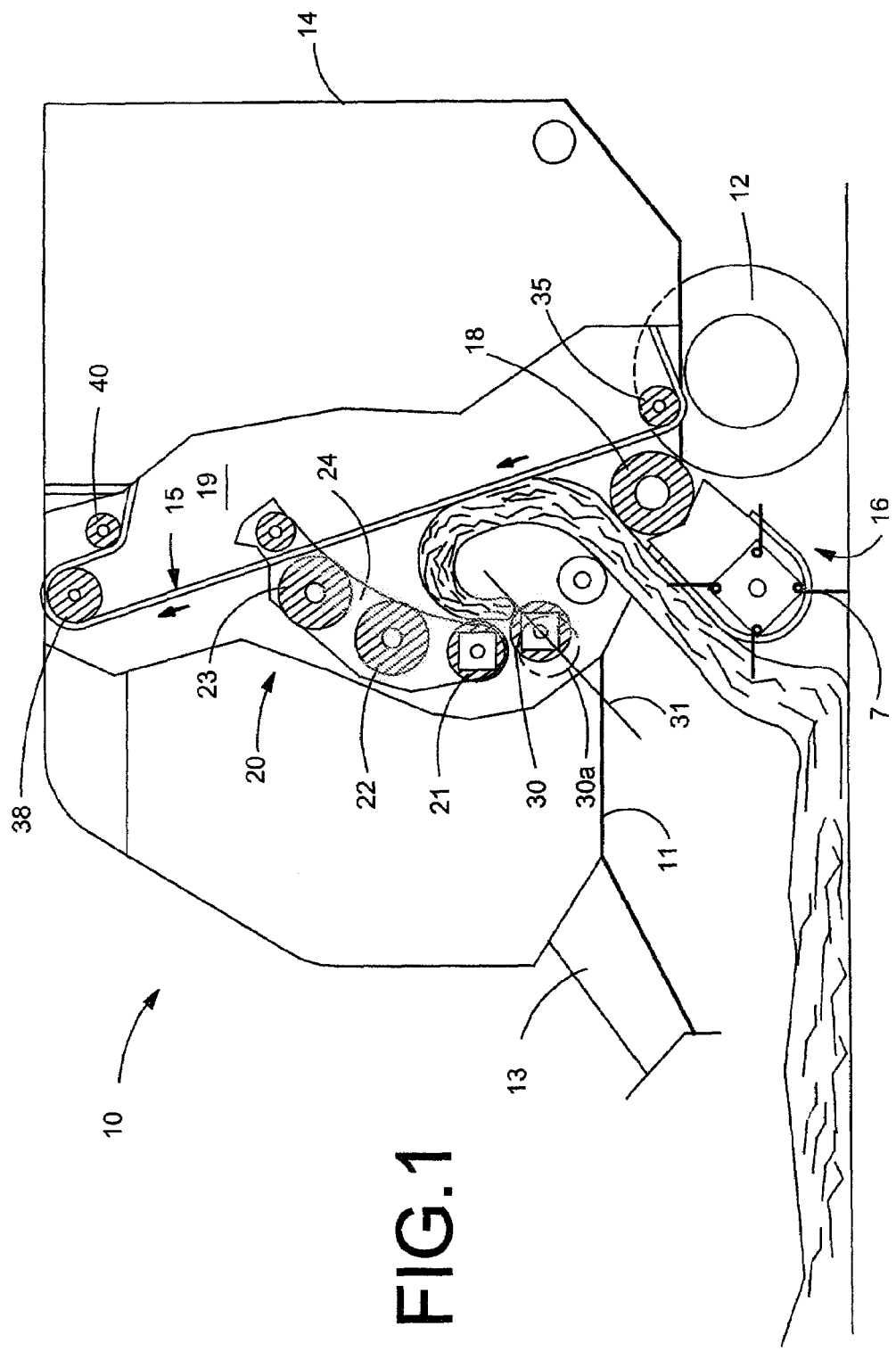
FIG. 1 is a perspective view of an agricultural round baler of the type which the present invention is advantageous.

Referring to the drawings for a detailed description of the preferred embodiment of the invention, FIG. 1 shows the cross section of a round baler 10 of the type having an expandable chamber defined in part by belts and rolls. This type of expandable chamber is disclosed in various prior art patents, e.g., U.S. Pat. No. 5,444,969, issued Aug. 29, 1995 to Wagstaff et al. and U.S. Pat. No. 6,098,391, issued Aug. 8, 2000 to Underhill, both of which are herein incorporated by reference.

Baler 10 has a main frame 11, comprising a plurality of rigid interconnected structural elements including a pair of side walls 19 (only one shown). Main frame 11 is supported by a pair of wheels 12 (also only one shown). A forwardly mounted tongue 13, integral with main frame 11, provides for connection to a tractor and defines a generally fore and aft axis aligned with the direction of travel. Pivotally connected to side walls 19 is a tailgate 14 which is closed during bale formation. A pickup 16, mounted on main frame 11, includes a plurality of tines 7, the tips of which are movable along a predetermined path to lift crop material from the ground and deliver it rearwardly toward a floor roll 18, rotatably mounted on main frame 11.

An expandable chamber for forming bales is defined partly by a sledge assembly 20 comprising a plurality of transversely extending rolls 21, 22, 23 journalled at their ends in a pair of spaced apart arms 24, one of which is shown. Rolls 21, 22, 23 are driven in a counter-clockwise direction by conventional means (for example, chains and sprockets) coupled via an appropriate drive train to a drive shaft powered by the tractor. A lower bale forming roll 30, located adjacent roll 21, is also driven counter-clockwise. Lower bale forming roll 30 is journalled at its ends on the side walls 19 of the round baler.

The bale forming chamber is further defined by an apron 15 comprising a plurality of laterally spaced side-by-side belts supported by guide rolls 35 (only one shown) rotatably mounted in tailgate 14. Apron 15 is also supported on a drive roll 38, mounted on main frame 11. Suitable coupling means (not shown) connected to the drive train provide rotation of drive roll 38 causing movement of apron 15 along the varying paths in the directions indicated by the arrows in FIG. 1. An additional guide roll 40 in the main frame 11 ensures proper driving engagement between apron 15 and drive roll 38.

When round baler 10 travels across a field, pickup tines 7 lift crop material from the ground and deliver it through the inlet. The crop material is carried rearwardly by floor roll 18 into engagement with apron 15 which urges it upwardly and forwardly into engagement with the rolls on sledge 20. During this transit, crop material is compressed in between lower bale forming roll 30 and floor roll 18 to form a slightly compacted mat of crop material that is then fed into the bale forming chamber. Continued feeding of crop material into the bale forming chamber by pickup tines 7 and rotation of the rolls and causes the apron 32 course to expand in length around a portion of the circumference of the cylindrical package of crop material as its diameter increases. A means of varying the position of apron 15 relative to rolls 21, 22, 23 allows the apron to maintain contact with the outside periphery of the bale as it diameter increases. After a cylindrical package of crop material has been formed in the fashion described and wrapped with twine or net in a well known manner to form a bale, tailgate 14 is opened and the bale is ejected rearwardly.

Optimal lower bale forming roll 30 position differs for different machine configurations and for different crops. In conventional round balers, the position of lower bale forming roll 30 is fixed in relation to the main frame. The present invention alleviates this limitation by providing an apparatus allowing selective positioning of the lower bale forming roll with respect to main frame 11 so that the roll is adjustable and may be optimized for the crop being baled or the specific machine configuration. The relation of the first and second positions for the lower bale forming roll as enabled by the present invention is shown as positions 30 and 30a in FIG. 1 and further illustrated in the remaining figures.

Now referring to FIGS. 2 through 5, the selective positioning apparatus the lower bale forming roll is described and presented. Lower bale forming roll 30 is supported by side walls 19 by journal 40, one on each transverse end of lower bale forming roll 30. Journal 40 comprises a bearing 42 and a mounting plate 44, also referred to as a flangette, which is secured to side wall 19, typically by a plurality of fasteners 46. Corresponding openings are provided in side wall 19 for engagement by fasteners 46 to allow mounting plate 44 to be secured to side wall 19. An axle shaft 32 laterally extending from each end of lower bale forming roll 30 rotatably engages bearing 42 to retain roll 30 in a fixed position in relation to the side wall 19 and the baler chassis 11. An aperture 17 in side wall 19 allows an end portion of axle shaft 32 to extend through the side wall. Aperture 17 is an elongate opening which allows limited radial movement of axle shaft 32 generally in the direction along a single axis 31 (shown in FIGS. 3 & 4).

Mounting plate 44 preferably includes four mounting fasteners 46 symmetrically oriented about shaft 32 in plate holes 45. In a conventional baler, four threaded openings would be provided in side wall 19 allowing the mounting plate 44 to be affixed to the side wall in a single location. In the present invention, aperture 17 is elongated such that one of the normal threaded openings in the side wall is eliminated. Adapter 50 is provided to cover a portion of aperture 17 and provide the missing fourth threaded opening for receiving a mounting plate fastener. The arrangement of threaded openings is such that the adapter 50 may be mounted in one of two positions, thus providing two possible mounting positions for the end bearing of lower bale forming roll 30.

Those skilled in the art will recognize that the threaded openings referred to herein may include a tapped hole, a smooth hole with a nut tack welded to the opposite side, a smooth hole through which extends a threaded fastener engaged by a conventional nut on the opposite side, an elongated slot connecting to the primary aperture allowing engagement by a bolt, nut, and washer, or any other functionally equivalent fastening means for connecting and securing adjacent structures. Use of the term threaded opening is intended as a representative means for connecting the structural elements and not intended to limit the means in which the adapter and mounting plate may be attached to the side wall.

Figure 5:
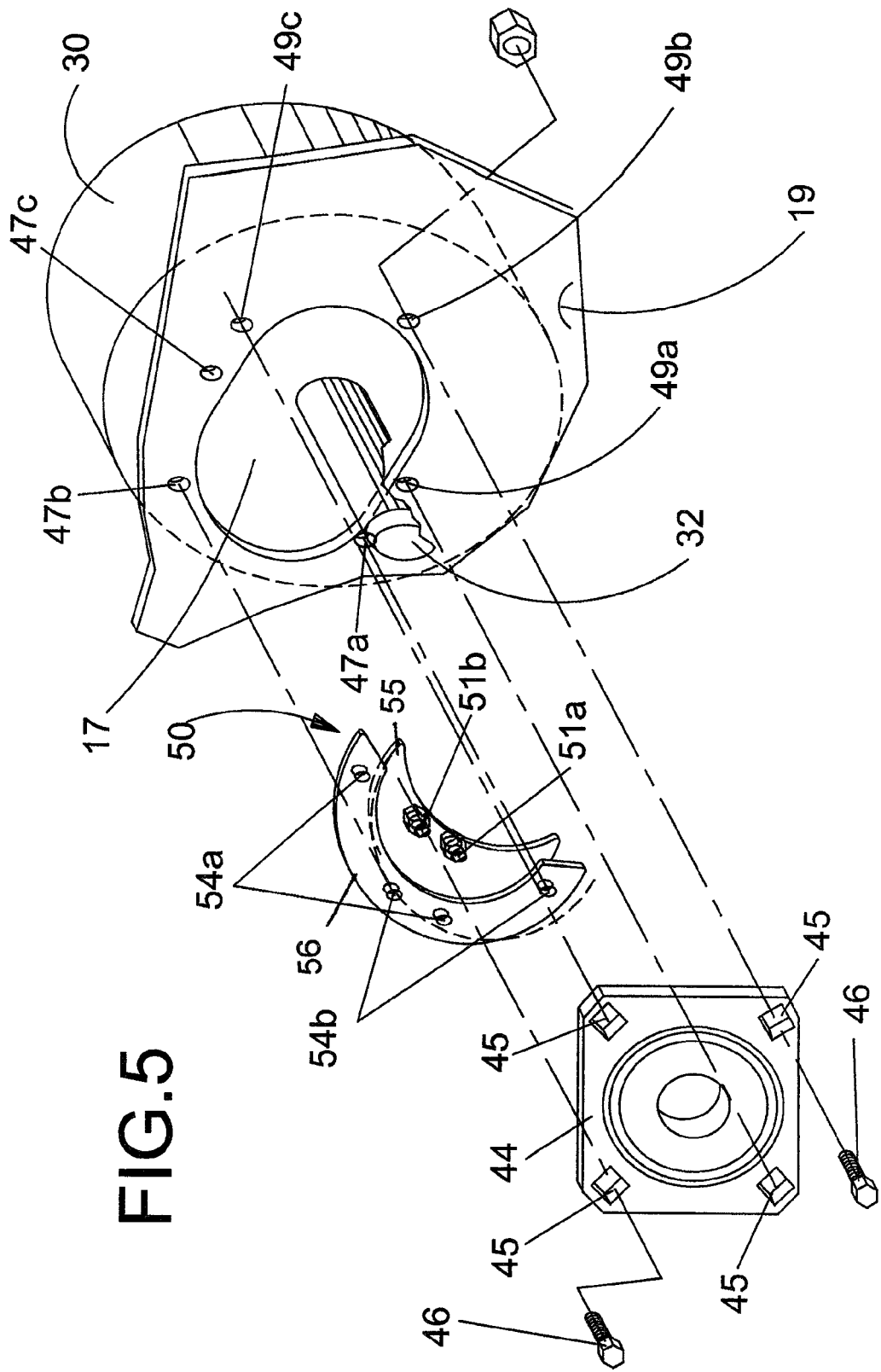
FIG. 5 is a partial perspective view of the main chassis of a round baler showing an exploded view of the adapter plate of the present invention and the end bearing mount for the lower bale forming roll.

Adapter 50 comprises two portions, best shown in FIG. 5. The inner portion 55 has an edge contour configured to fit within a portion of the elongated aperture 17, filling a portion of the elongated aperture so that a generally circular opening remains through which the roller axle 32 may pass. The inner portion must fit within the aperture so that the face of the inner portion 55 may align with the planar surface of the side wall 19 thereby providing a generally planar surface on which mounting plate 44 may be connected. Outer portion 56 is connected to inner portion 55 and offset from the plane of inner portion to allow outer portion to be positioned adjacent to and in contact with the planar surface of the side wall.

The resulting configuration is that a first plurality of threaded openings 47a, 47b, 47c are provided in side wall 19 which, in conjunction with first position mount 51a on adapter 50, provide four threaded openings aligned with plate holes 45 when the plate is in a first location (shown in FIG. 3). A second plurality of threaded openings 49a, 49b, 49c are provided in side wall 19 which along with second position mount 51b on adapter 50, provide four threaded openings aligned with plate holes 45 when the plate is positioned in a second location (shown in FIG. 4). Repositioning adapter 50 between the first and second positions requires simply rotating the adapter 180 degrees in the plane of the side wall 19 and shifting it laterally along the side wall. Adapter 50 is secured to side wall 19 using fasteners engaging threaded openings in the side wall, shown as 47a, 47b when in the first position, and 49b, 49c when the adapter is in the second position. Adapter holes 54a, 54b are provided to enable threaded fasteners to engage the respective threaded openings. Because of the two-position mounting requirement for adapter 50, additional holes are needed in the adapter to align with threaded opening on the side wall and the mounting plate. Thus, adapter holes 54a and first position mount 51a are utilized when the roll is positioned in the first position. Adapter holes 54b and second position mount 51b are used with the roll is positioned in the second position. No changes in the hole 45 pattern in mounting plate 44 are required which allows a standard part to be utilized and avoids redesign or retooling of the mounting plate.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A mounting apparatus for a bale-forming roll in a round baler, the round baler having an apron, a wheel-supported frame with an elongate fore and aft axis, a pair of laterally displaced generally parallel and opposing planar side walls supported by the frame, at least one bale-forming roll generally transversely disposed with respect to the fore and aft axis and generally horizontal, the roll further having an elongate axle with an axis of rotation and generally opposing ends rotatably supported by the mounting apparatus, a pair of elongated apertures, one of the elongated apertures in each of the side walls, through which respective ends of the axle extend, each mounting apparatus comprising:

a mounting plate having a bearing for connection to said axle, said mounting plate and bearing, when connected to the respective side wall, restraining movement of said axle to substantially rotational about the axis of rotation;

a reversible adapter for covering a portion of said aperture while allowing said axle to extend therethrough, said adapter being selectively connectable to the respective side wall in either a first location or a second location; and a structure for selectively connecting said mounting plate to said respective side wall in one of two positions, the second position being radially displaced from the first position, said structure further including a first connector structure for connecting said mounting plate to said side wall and a second connector structure for connecting said mounting plate to said adapter which is, in turn, connected to said side wall wherein by positioning said adapter in said first location said bale-forming roll is located in a first position, and by positioning said adapter in said second location said axis of rotation of said bale-forming roll is radially displaced from said first location.

2. The apparatus of claim 1, wherein said first connector structure is a plurality of fasteners simultaneously engaging a plurality of openings in said mounting plate and a plurality of openings in said side wall.

3. The apparatus of claim 2, wherein said second connector structure for connecting said mounting plate to said adapter is at least one fastener simultaneously engaging at least one of said plurality of openings in said mounting plate and at least one opening in said adapter.

4. The apparatus of claim 3, wherein said plurality of openings in said side wall further comprises a first plurality of openings and a second plurality of openings, said first plurality of openings being engaged by said plurality of fasteners when said adapter is in said first location and said second plurality of openings being engaged by said plurality of fasteners when said adapter is in said second location.

5. The apparatus of claim 4, wherein said plurality of openings in said side wall are holes.

6. The apparatus of claim 4, wherein said plurality of openings in said side wall are elongated slots connecting to said aperture.

7. The apparatus of claim 4, wherein said adapter is rotated about an axis perpendicular to the plane of the side wall when repositioning said adapter between said first and second locations.

8. The apparatus of claim 7, wherein said adapter is rotated approximately 180 degrees about an axis perpendicular to the plane of the side wall when repositioning said adapter between said first and second locations.

9. A mounting apparatus for a roll in a round baler, the round baler having an apron, a wheel-supported frame and an elongate generally fore and aft axis, a pair of laterally displaced generally parallel and opposing planar side walls supported by the frame, a pair of elongated apertures, one of the elongated apertures in each of the side walls, at least one roll transversely disposed between the side walls, the roll being supported by an elongate axle rotatably supported at each end on the side walls by the mounting apparatus, each end of the axle extending through the respective aperture, each mounting apparatus comprising:

a mounting plate having a bearing for connection to said axle, said mounting plate and bearing restraining movement of said axle to substantially rotational;

a first plurality of holes in said mounting plate through which a first plurality of fasteners are inserted;

a first plurality of receptacles in said side wall for receiving said first plurality of fasteners and securing said mounting plate in a first position;

a second plurality of receptacles in said side wall for receiving said first plurality of fasteners and securing said mounting plate in a second position; and a reversible adapter for covering a portion of said aperture while allowing said axle to extend therethrough, said adapter having at least one mounting opening for receiving one of said first plurality of fasteners and a structure to secure said adapter to said side wall using at least two of said second plurality of receptacles in said side wall when said mounting plate is in said first position or at least two of said first plurality of receptacles in said side wall when said mounting plate is in said second position, and by positioning said mounting plate in said second position, an axis of rotation of said roll is radially displaced from said first position.

10. The apparatus of claim 9, wherein said aperture is an elongated slot having a pair of opposing rounded end contours, and said adapter comprises a first portion and a second portion, said first portion having generally planar and parallel opposing first and second surfaces separated by a contoured edge, a portion of said contoured edge matching one of said rounded end contours thereby enabling said first portion to be positioned substantially within said aperture such that said first surface is aligned with a plane of the side wall and the contoured edge is generally in contact with one of the rounded end contours, said second portion having said first plurality of holes disposed therethrough for connecting said second portion adjacent to the plane of said side wall.

11. The apparatus of claim 10, wherein said adapter is reoriented between said first and second positions by rotation about an axis perpendicular to the plane of said adapter.

12. In a round baler having an apron, a wheel-supported frame with an elongate fore and aft axis, a pair of laterally displaced generally parallel and opposing planar side walls supported by the frame, at least one bale-forming roll generally transversely disposed with respect to the fore and aft axis and generally horizontal, the roll further having an elongate axle with an axis of rotation and generally opposing ends rotatably supported on respective side walls, a pair of elongated apertures, one of the elongated apertures in each of the side walls, through which respective ends of the axle extend, the improvement comprising:

a mounting plate having a bearing for connection to the axle, said mounting plate and bearing, when connected to the respective side wall, restraining movement of said axle to substantially rotational about the axis of rotation;

a reversible adapter for covering a portion of said aperture while allowing said axle to extend therethrough, said adapter being selectively connectable to the respective side wall in either a first location or a second location; and a structure for selectively connecting said mounting plate to said respective side wall in one of two positions, the second position being radially displaced from the first position, said structure further including a first connector structure for connecting said mounting plate to said side wall and a second connector structure for connecting said mounting plate to said adapter which is, in turn, connected to said side wall wherein by positioning said adapter in said first location said bale-forming roll is located in a first position, and by positioning said adapter in said second location said axis of rotation of said bale-forming roll is radially displaced from said first location.

13. The improvement of claim 12, wherein said first connector structure is a plurality of fasteners simultaneously engaging a plurality of openings in said mounting plate and a plurality of openings in said side wall.

14. The improvement of claim 13, wherein said second connector structure for connecting said mounting plate to said adapter is at least one fastener simultaneously engaging at least one of said plurality of openings in said mounting plate and at least one opening in said adapter.

15. The improvement of claim 14, wherein said plurality of openings in said side wall further comprises a first plurality of openings and a second plurality of openings, said first plurality of openings being engaged by said plurality of fasteners when said adapter is in said first location and said second plurality of openings being engaged by said plurality of fasteners when said adapter is in said second location.

16. The improvement of claim 15, wherein said plurality of openings in said side wall are holes.

17. The improvement of claim 15, wherein said plurality of openings in said side wall are elongated slots connecting to said aperture.

18. The improvement of claim 15, wherein said adapter is rotated about an axis perpendicular to the plane of the side wall when repositioning said adapter between said first and second locations.

19. The improvement of claim 18, wherein said adapter is rotated approximately 180 degrees about an axis perpendicular to the plane of the side wall when repositioning said adapter between said first and second locations.

* * * * *